United States Patent
Bourreau et al.

(10) Patent No.: US 12,529,823 B2
(45) Date of Patent: Jan. 20, 2026

(54) OPTICAL ELEMENT

(71) Applicant: VIAVI Solutions Inc., Chandler, AZ (US)

(72) Inventors: Christophe Bourreau, Paris (FR); Tasso Sales, Pittsford, NY (US)

(73) Assignee: VIAVI Solutions Inc., Chandler, AZ (US)

( * ) Notice: Subject to any disclaimer, the term of this patent is extended or adjusted under 35 U.S.C. 154(b) by 573 days.

(21) Appl. No.: 18/046,591

(22) Filed: Oct. 14, 2022

(65) Prior Publication Data

US 2024/0125979 A1 Apr. 18, 2024

(51) Int. Cl.
*G02B 1/11* (2015.01)
*G02B 5/20* (2006.01)
*G02B 5/00* (2006.01)

(52) U.S. Cl.
CPC ............... *G02B 1/11* (2013.01); *G02B 5/20* (2013.01); *G02B 5/003* (2013.01); *G02B 2207/101* (2013.01)

(58) Field of Classification Search
CPC . G02B 1/11; G02B 5/20; G02B 5/003; G02B 2207/101; G02B 13/0085; G02B 5/005; G02B 1/10; G02B 3/0062; G02B 1/12; G02B 3/0012; G02B 17/0856; G02B 13/00; G02B 5/00; G01D 5/26; G01J 3/0205
See application file for complete search history.

(56) References Cited

U.S. PATENT DOCUMENTS

| | | | | |
|---|---|---|---|---|
| 6,754,005 B2 * | 6/2004 | Goto | .................... | G03B 21/625 359/456 |
| 8,610,823 B2 | 12/2013 | Rossi et al. | | |
| 9,176,370 B1 * | 11/2015 | Norton | .................... | G02B 3/00 |
| 9,921,393 B2 * | 3/2018 | Kao | ........................ | G02B 5/005 |
| 11,056,522 B2 | 7/2021 | Bradley, Jr. et al. | | |
| 11,614,569 B2 * | 3/2023 | Akutsu | ................... | G06F 3/042 345/175 |
| 2004/0185588 A1 * | 9/2004 | Fukuyoshi | ............ | H10F 39/024 438/22 |
| 2005/0083571 A1 * | 4/2005 | Shimizu | ............... | G02B 3/0068 359/456 |
| 2006/0061861 A1 * | 3/2006 | Munro | ................. | G03B 21/625 359/456 |
| 2006/0268404 A1 * | 11/2006 | Hyobu | ................. | G03B 21/625 359/456 |
| 2010/0002314 A1 | 1/2010 | Duparre | | |

(Continued)

FOREIGN PATENT DOCUMENTS

| | | |
|---|---|---|
| EP | 2223173 B1 | 9/2013 |
| EP | 4030214 A1 | 7/2022 |

OTHER PUBLICATIONS

Extended European Search Report for Application No. EP23201282.3, mailed on Feb. 26, 2024, 08 pages.

*Primary Examiner* — Balram T Parbadia
(74) *Attorney, Agent, or Firm* — Harrity & Harrity, LLP

(57) ABSTRACT

In some implementations, an optical element comprises a glass substrate, a dark mirror coating disposed on a first surface of the glass substrate, and a lens disposed on a second surface of the glass substrate. An aperture is formed in the dark mirror coating, and the aperture is aligned with the lens. The optical element is a monolithic optical element.

20 Claims, 15 Drawing Sheets

(56) References Cited

U.S. PATENT DOCUMENTS

| | | | |
|---|---|---|---|
| 2011/0032409 A1* | 2/2011 | Rossi | G02B 27/0018 |
| | | | 348/340 |
| 2016/0048011 A1* | 2/2016 | Suzuki | G02B 21/14 |
| | | | 359/387 |
| 2016/0131900 A1* | 5/2016 | Pretorius | G02B 13/0095 |
| | | | 359/368 |
| 2019/0080138 A1* | 3/2019 | Gao | G02B 3/0031 |
| 2019/0165024 A1* | 5/2019 | Bradley, Jr. | H10F 39/806 |
| 2019/0312072 A1* | 10/2019 | Cho | H10F 39/024 |
| 2020/0012081 A1* | 1/2020 | Komai | H10F 39/026 |
| 2022/0269082 A1* | 8/2022 | Huang | G02B 5/003 |
| 2022/0293657 A1* | 9/2022 | Chou | G02B 5/003 |
| 2022/0385848 A1* | 12/2022 | Venkataraman | G06T 11/60 |
| 2025/0085160 A1* | 3/2025 | Siess | G01J 1/4228 |

* cited by examiner

OPTICAL ELEMENT

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The array of sensor elements may be associated with a lens that directs the light to the array of sensor elements.

SUMMARY

In some implementations, an optical element comprises: a glass substrate; a dark mirror coating disposed on a first surface of the glass substrate; and a lens disposed on a second surface of the glass substrate, wherein an aperture is formed in the dark mirror coating, and the aperture is aligned with the lens.

In some implementations, an optical device comprises: an optical sensor; and an optical element comprising: a glass substrate; a dark mirror coating disposed on a first surface of the glass substrate; and a lens disposed on a second surface of the glass substrate, wherein an aperture is formed in the dark mirror coating, and the aperture is aligned with the lens.

In some implementations, a wafer includes a plurality of optical elements, wherein each optical element includes: a glass substrate; a dark mirror coating disposed on a first surface of the glass substrate; and a lens disposed on a second surface of the glass substrate, wherein an aperture is formed in the dark mirror coating, and the aperture is aligned with the lens.

DETAILED DESCRIPTION

Figure 1A:
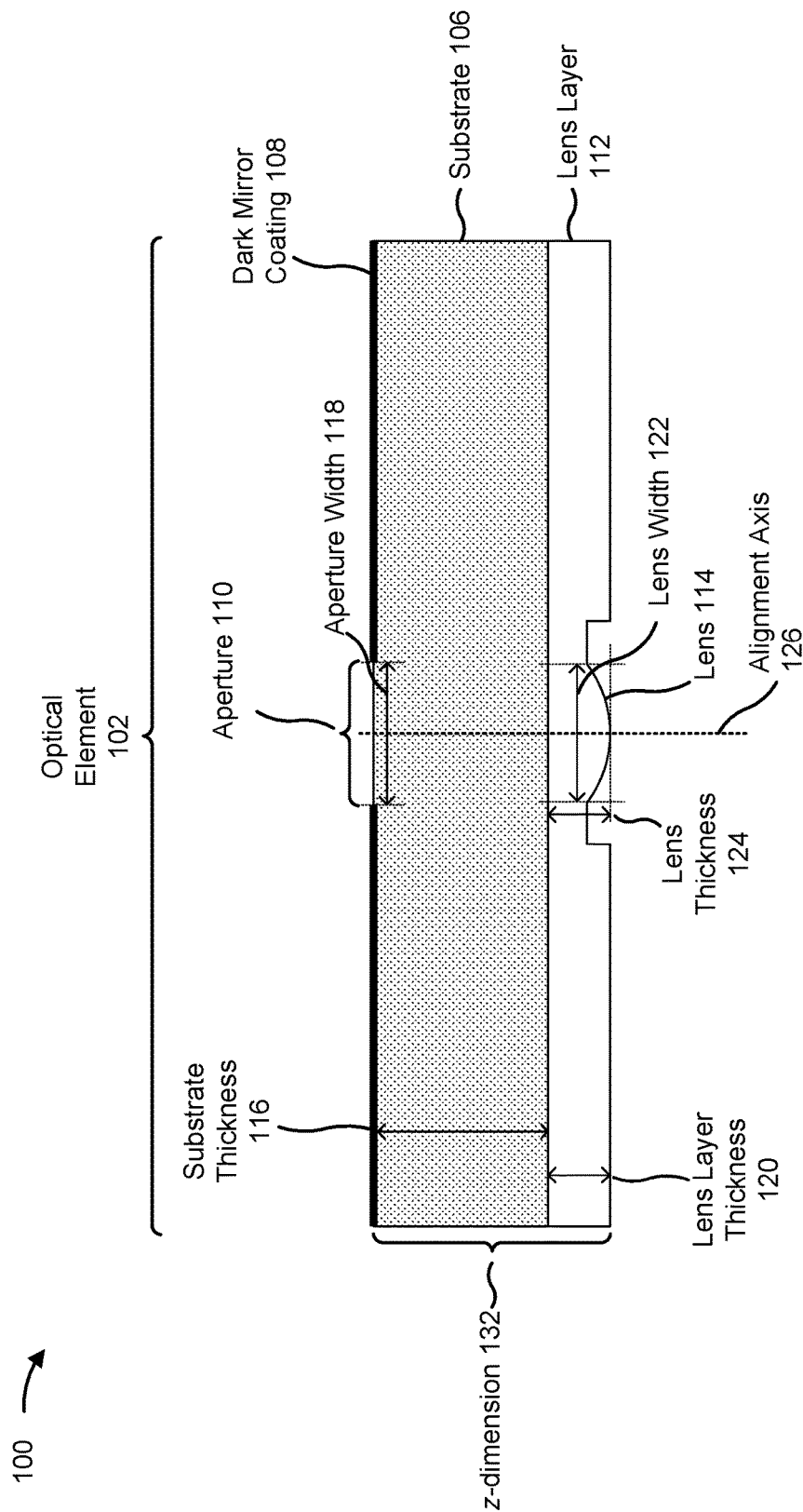
FIGS. 1A-1C are diagrams of an example implementation of an optical device described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical sensor device can include a glass lens and an optical sensor. The glass lens can be configured to direct light (e.g., that is associated with a subject or environment) to the optical sensor, which can analyze the light to determine information related to the light (e.g., information related to the subject or environment). However, typically, conventional lenses or assemblies are bulky and generally require significant packaging space. Further, an aperture is typically required to limit a field-of-view of the optical sensor device, which needs to be aligned to the lens or a lens assembly using a separate operation that further adds to assembly complexity of the optical sensor device. If a misalignment occurs, for whatever reason, a performance of the optical sensor is degraded.

Some implementations described herein provide an optical element. The optical element comprises a glass substrate, a dark mirror coating disposed on a first surface of the glass substrate, and a lens (e.g., comprising a polymer, or another transparent material that is organic or inorganic), disposed on a second surface of the glass substrate. An aperture is formed in the dark mirror coating, and the aperture is aligned with the lens. In some implementations, the optical element includes an additional substrate and/or an additional lens disposed on the dark mirror coating (e.g., on the first surface of the glass substrate). Additionally, or alternatively, the optical element includes an optical filter (e.g., disposed in the aperture). The optical element is a monolithic optical element.

In this way, the optical element can be used to replace a conventional glass lens. For example, the optical element can be included in an optical device with an optical sensor and may be used to direct light to the optical sensor. Because the optical element is a monolithic optical element, the lens cannot become misaligned during the operative life of the optical element. The optical element can therefore facilitate an improved performance of the optical sensor (e.g., as compared to that provided by a glass lens).

Further, the dark mirror coating and the aperture of the optical element prevent unwanted light from propagating to the lens, and thereby prevent, or minimize, unwanted light from propagating to the optical sensor. This improves a performance of the optical sensor. For example, an amount of "noise" light that is received by the optical sensor is reduced, which enables the optical sensor to determine more accurate information (e.g., based on wanted light).

Further, the dark mirror coating and the lens(es) may be formed on the glass substrate using wafer-level processing. This allows for many optical elements to be formed at once, and for each optical element to be formed such that an aperture is aligned with the lens(es). This ensures a consistent quality of the optical elements. Further, because only the optical element and the optical sensor device need to be aligned in the optical device, resources (e.g., manufacturing resources) do not need to be used to align one or more lenses, a separate aperture, and an optical sensor in an optical device. Moreover, the optical element may include, in some implementations, one or more fiducials, or other alignment components, to facilitate alignment with an optical sensor device in an optical device.

Additionally, because the optical element is a monolithic optical element that includes an aperture and a lens, the optical element has a smaller form factor than that of individual components that need be aligned in an optical device. Therefore, a form factor of the optical device is smaller than that of an optical device that does not utilize an optical element described herein. This enables the optical device to be used in some applications (e.g., some light sensing applications), such as for an eye tracking sensor in a virtual reality headset, in which a device with a larger form factor is not preferable.

Figure 1B:
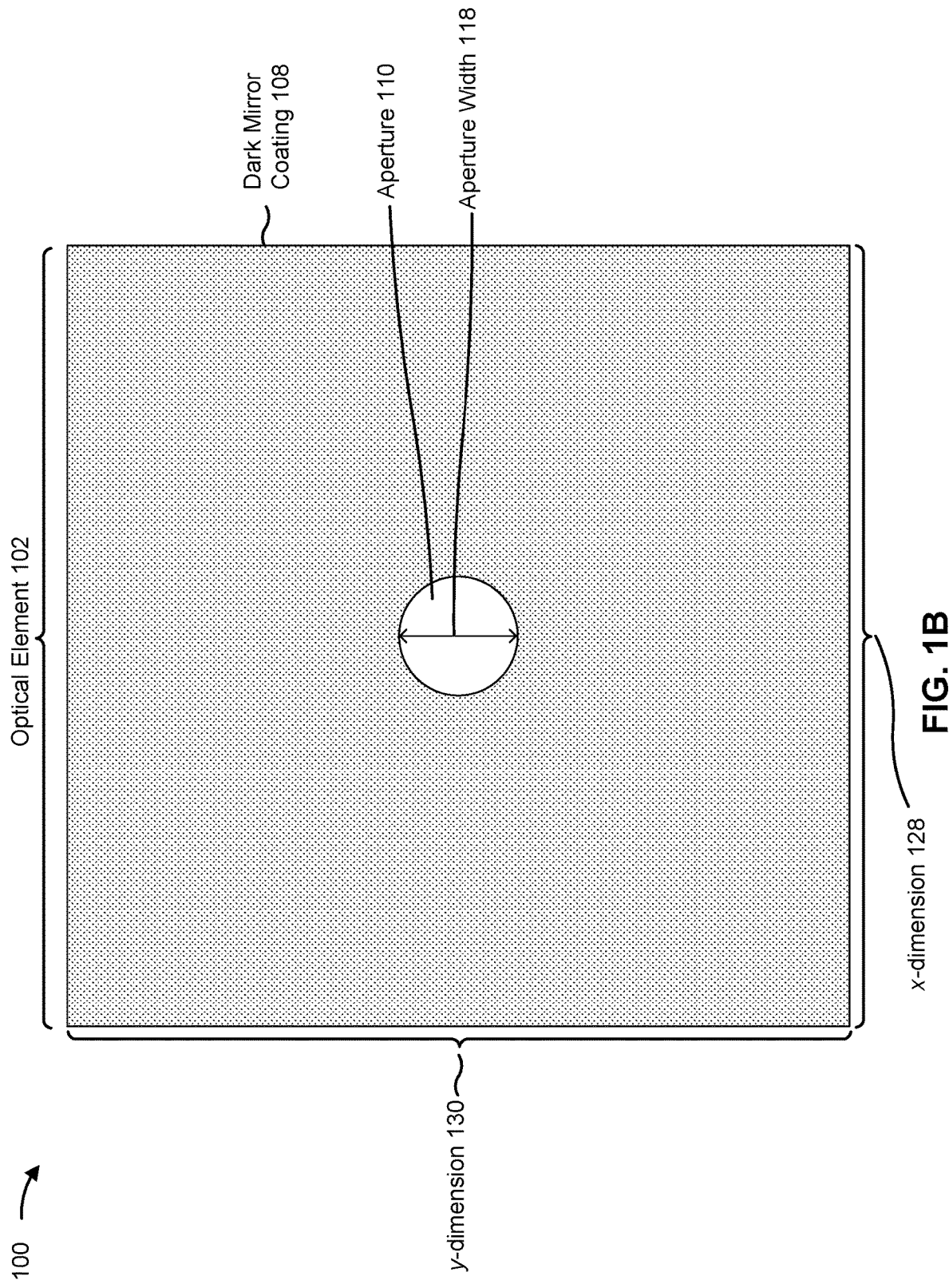
Figure 1C:
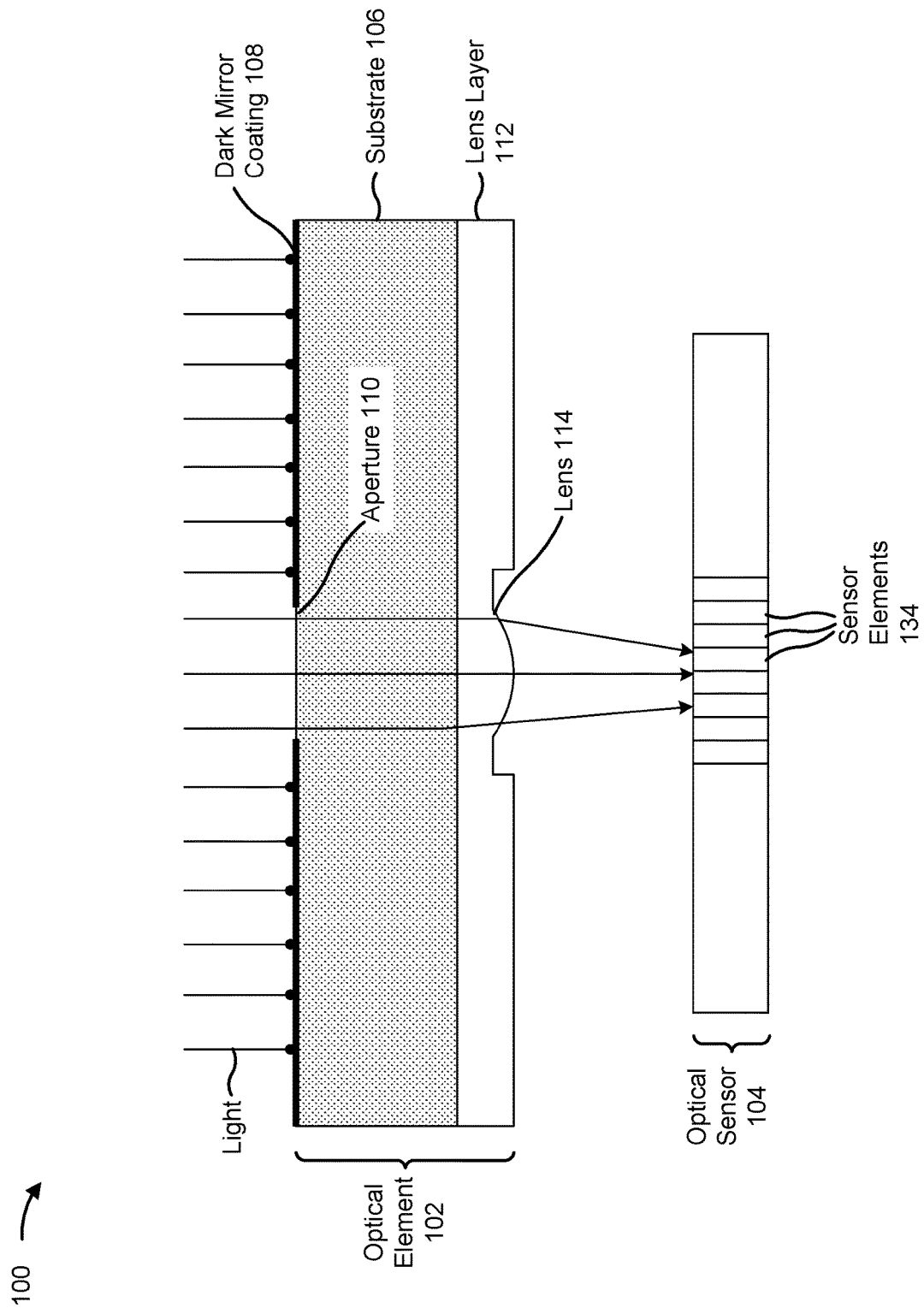

FIGS. 1A-1C are diagrams of an example implementation of an optical device 100 described herein. As shown in FIGS. 1A-1C, the optical device 100 includes an optical element 102 and/or an optical sensor 104. FIG. 1A shows an example side, cross-section view of the optical element 102. FIG. 1B shows an example top-down view of the optical element 102. FIG. 1C shows an example propagation of light through the optical element 102 to the optical sensor 104.

As shown in FIG. 1A, the optical element 102 may include a substrate 106, a dark mirror coating 108, an aperture 110 (e.g., formed in the dark mirror coating 108), a lens layer 112, and/or a lens 114 (e.g., formed in the lens layer 112). The substrate 106 may comprise a glass substrate, a polymer substrate, a polycarbonate substrate, a metal substrate, a silicon (Si) substrate, or a germanium (Ge) substrate, among other examples. In some implementations, a thickness 116 of the substrate 106 (a maximum thickness of the substrate 106, an average thickness of the substrate 106, or another measurement from a bottom surface of the substrate 106 to a top surface of the substrate 106) may be greater than or equal to 200 micrometers (μm), 300 μm, 400 μm, 500 μm, 550 μm, 1 millimeter (mm), 1.1 mm, and/or 2 mm. Additionally, or alternatively, the thickness 116 of the substrate 106 may be less than or equal to a particular thickness threshold. The particular thickness threshold, for example, may be less than or equal to 2 mm. Accordingly, the thickness 116 of the substrate 106 may be, for example, in a range from 100 μm to 2 mm The dark mirror coating 108 may be disposed on (e.g., disposed directly on) a first surface of the substrate 106. For example, as shown in FIGS. 1A-1B, the dark mirror coating 108 may be disposed on a top surface of the substrate 106. The dark mirror coating 108 may be configured to reflect less than a threshold percentage of light associated with one or more spectral ranges, where the threshold percentage of light is less than or equal to 0.5%, 1%, 2%, 3%, 4%, and/or 5%, among other examples. In some implementations, the dark mirror coating 108 may be configured to transmit less than the threshold percentage of light associated with one or more spectral ranges. The one or more spectral ranges may be within a wavelength range from 350 nanometers (nm) to 2000 nm.

Accordingly, the dark mirror coating 108 may be configured to reduce both reflection and transmission (e.g., through the substrate 106) of light associated with the one or more spectral ranges, and thus may also be termed as an absorptive anti-reflective (AAR) coating. The dark mirror coating 108 may comprise one or more layers, such as one or more absorbing layers, one or more blocking layers, one or more anti-reflective layers (e.g., arranged in a particular stack order), and/or one or more other layers. For example, the dark mirror coating 108 may include one or more dielectric/metal (DM) pairs of layers. A D layer, in a DM pair of layers, may include a dielectric material or a combination or mixture of two or more dielectric materials, such as $SiO_2$, $Ta_2O_5$, $NbTaO_5$, $Nb_2O_5$, $TiO_2$, $NbTiO_x$, $Al_2O_3$, $Si_3N_4$, $Cr_2O_3$, $MoO_3$, and combinations thereof. An M layer, of the DM pair of layers, may include a metal, such as aluminum, a gray metal, or an alloy thereof (e.g., an alloy of two or more gray metals, an alloy of at least one gray metal and at least one other metal, an alloy of aluminum and at least one other metal that may or may not include a gray metal). Examples of gray metals include, without limitation, tantalum, niobium, titanium, nickel, chromium, silicon, and alloys thereof, such as tantalum-niobium alloys (e.g., $Ta_{80}Nb_{20}$, $Ta_{60}Nb_{40}$, $Ta_{40}Nb_{60}$, and/or $Ta_{20}Nb_{80}$).

In some implementations, a thickness of the dark mirror coating 108 (a maximum thickness of the dark mirror coating 108, an average thickness of the dark mirror coating 108, or another measurement from a bottom surface of the dark mirror coating 108 to a top surface of the dark mirror coating 108) may be greater than or equal to 1 μm, 2 μm, 5 μm, and/or 10 μm. Additionally, or alternatively, the thickness of the dark mirror coating 108 may be less than or equal to a particular thickness threshold. The particular thickness threshold, for example, may be less than or equal to 10 μm. Accordingly, the thickness of the dark mirror coating 108 may be, for example, in a range from 1 μm to 15 μm.

The aperture 110 may be formed in the dark mirror coating 108. The aperture 110 may be, for example, a region of the first surface of the substrate 106 on which the dark mirror coating 108 is not disposed. That is, the aperture 110 may be a region of the first surface of the substrate 106 that is not covered by the dark mirror coating 108. In some implementations, the aperture 110 may have, from a top-down view of the aperture 110, a round shape (e.g., a circular shape, an oval shape, and/or another round shape), such as the round shape shown in FIG. 1B. Alternatively, the aperture 110 may have a polygonal shape, such as a triangular shape, a rectangular shape, a pentagonal shape, a hexagonal shape, or another polygonal shape. In some implementations, a width 118 of the aperture 110 (e.g., a diameter of the aperture 110 and/or a maximum distance measurement from one side of the aperture 110 to another side of the aperture 110) may be greater than or equal to 5 μm, 10 μm, 20 μm, 30 μm, 40 μm, 50 μm, and/or 100 μm. Additionally, or alternatively, the width 118 of the aperture 110 may be less than or equal to a particular thickness threshold. The particular thickness threshold, for example, may be less than or equal to 100 μm. Accordingly, the width 118 of the aperture 110 may be, for example, in a range from 5 μm to 100 μm.

The lens layer 112 may be disposed on (e.g., directly disposed on) a surface of the substrate 106 (e.g., a second surface of the substrate 106 other than the first surface on which the dark mirror coating 108 is disposed). For example, as shown in FIG. 1A, the lens layer 112 may be disposed on a bottom surface of the substrate 106. The lens layer 112 may be a replicated organic lens layer or an etched inorganic lens layer. For example, the lens layer 112 may comprise a polymer, such as polymethyl-methacrylate (PMMA), polystyrene, polycarbonate, cyclic olefin polymer (COP), polyester (OKP), and/or another polymer, or an inorganic material, such as fused silica, silicon, germanium, tantalum, and/or silicon nitride, among other examples. In some implementations, a thickness 120 of the lens layer 112 (a maximum thickness of the lens layer 112, an average thickness of the lens layer 112, or another measurement from a bottom surface of the lens layer 112 to a top surface of the lens layer 112) may be greater than or equal to 5 μm, 10 μm, 20 μm, 30 μm, 40 μm, 50 μm, and/or 100 μm. Additionally, or alternatively, the thickness 120 of the lens layer 112 may be less than or equal to a particular thickness threshold. The particular thickness threshold, for example, may be less than or equal to 100 μm. Accordingly, the thickness 120 of the lens layer 112 may be, for example, in a range from 5 μm to 100 μm.

The lens 114 may be formed in the lens layer 112 (e.g., comprising a polymer or an inorganic material). Accordingly, the lens 114 may be a polymer lens that comprises, for example, PMMA, polystyrene, polycarbonate, COP, OKP, and/or another polymer. Alternatively, the lens 114 may comprise an inorganic material, such as fused silica, silicon, germanium, tantalum, and/or silicon nitride, among other examples. The lens 114 may be configured to receive light that passes through the aperture 110 and the substrate 106 and to direct the light (e.g., as described elsewhere herein). The lens 114 may be configured to collimate, converge, diverge, and/or otherwise direct one or more portions of the light.

In some implementations, a width 122 of the lens 114 (e.g., a diameter of the lens 114 and/or a maximum distance measurement from one side of the lens 114 to another side of the lens 114) may be greater than or equal to 5 µm, 10 µm, 20 µm, 30 µm, 40 µm, 50 µm, and/or 100 µm. Additionally, or alternatively, the width 122 of the lens 114 may be less than or equal to a particular width threshold. The particular width threshold, for example, may be less than or equal to 100 µm. Accordingly, the width 122 of the lens 114 may be, for example, in a range from 5 µm to 100 µm. In some implementations, a thickness 124 of the lens 114 (e.g., a maximum thickness of the lens 114, an average thickness of the lens 114, or another measurement from a bottom surface of the lens 114 to a top surface of the lens 114) may be less than or equal to the thickness 120 of the lens layer 112.

In some implementations, the aperture 110 may be aligned with the lens 114. For example, as shown in FIG. 1A, the aperture 110 and the lens 114 may both be centered on an alignment axis 126 (e.g., the alignment axis 126 passes through respective center portions of the aperture 110 and the lens 114). That is, as shown in FIG. 1A, the aperture 110 and the lens 114 may be vertically stacked along the alignment axis 126. The alignment axis 126 may be, for example, an optical axis of the lens 114.

In some implementations, the optical element 102 may be a monolithic optical element (e.g., the components of the optical element 102 are formed into a single, unified component). Accordingly, the optical element 102 has one or more dimensions, such as an x-dimension 128, a y-dimension 130, and a z-dimension 132. For example, as shown in FIGS. 1A-1B, the x-dimension 128 may be a width of the optical element 102, the y-dimension 130 may be a length of the optical element 102, and the z-dimension 132 may be a thickness of the optical element 102. In some implementations, each of the x-dimension 128 and the y-dimension 130 may be greater than or equal to 500 µm, 750 µm, 1 mm, 1.2 mm, 1.4 mm, and/or 1.75 mm. Additionally, or alternatively, each of the x-dimension 128 and the y-dimension 130 may be less than or equal to a particular dimension threshold. The particular dimension threshold, for example, may be less than or equal to 5 mm. Accordingly, each of the x-dimension 128 and the y-dimension 130 may be, for example, in a range from 500 µm to 5 mm. In some implementations, the z-dimension 132 may be less than or equal to a particular thickness threshold, which may be less than or equal to 225 µm, 250 µm, 300 µm, 400 µm 500 µm, 700 µm, 1 mm, 1.1 mm, 1.5 mm, 2 mm, 2.1 mm, and/or other examples.

As shown in FIG. 1C, the optical sensor 104 may include one or more sensor elements 134 (e.g., an array of sensor elements, also referred to herein as a sensor array), each configured to obtain information. For example, a sensor element 134 may provide an indication of intensity of light (e.g., that passes through the optical element 102) that is incident on the sensor element 134 (e.g., active/inactive or a more granular indication of intensity). The optical sensor 104 may be configured to collect the information obtained by the one or more sensor elements 134 to generate sensor data.

In some implementations, the optical element 102 and the optical sensor 104 may be aligned, such that the aperture 110 and the lens 114 are aligned with the one or more sensor elements 134. For example, as shown in FIG. 1C, the optical element 102 and the optical sensor 104 may be aligned such that one or more portions of light (e.g., that are associated with one or more spectral ranges) that fall incident on a surface of the optical element 102 (e.g., on a top surface of the optical element 102) pass through the aperture 110, propagate through the substrate 106, and are directed by the lens 114 (e.g., from a bottom surface of the optical element 102) to the one or more sensor elements 134 of the optical sensor 104. The lens 114 may be configured to converge the light on the one or more sensor elements 134. As further shown in FIG. 1C, the dark mirror coating 108 may absorb, block, and/or otherwise prevent reflection of (e.g., from the surface of the optical element 102) and/or transmission of (e.g., through the substrate 106) one or more other portions of the light that fall incident on the surface of the optical element 102.

As indicated above, FIGS. 1A-1C are provided as examples. Other examples may differ from what is described with regard to FIGS. 1A-1C.

Figure 2A:
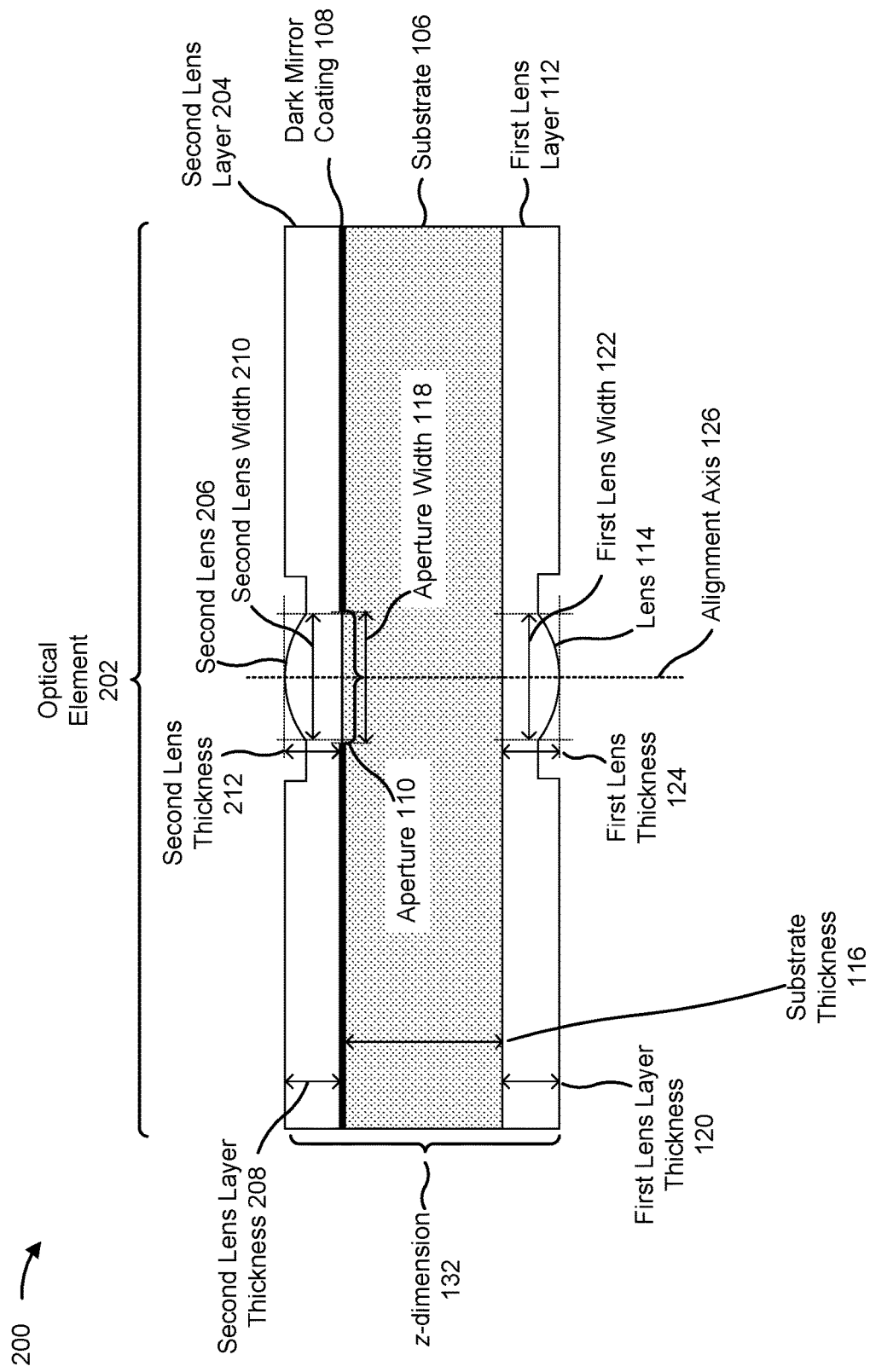
FIGS. 2A-2B are diagrams of an example implementation of an optical device described herein.
Figure 2B:
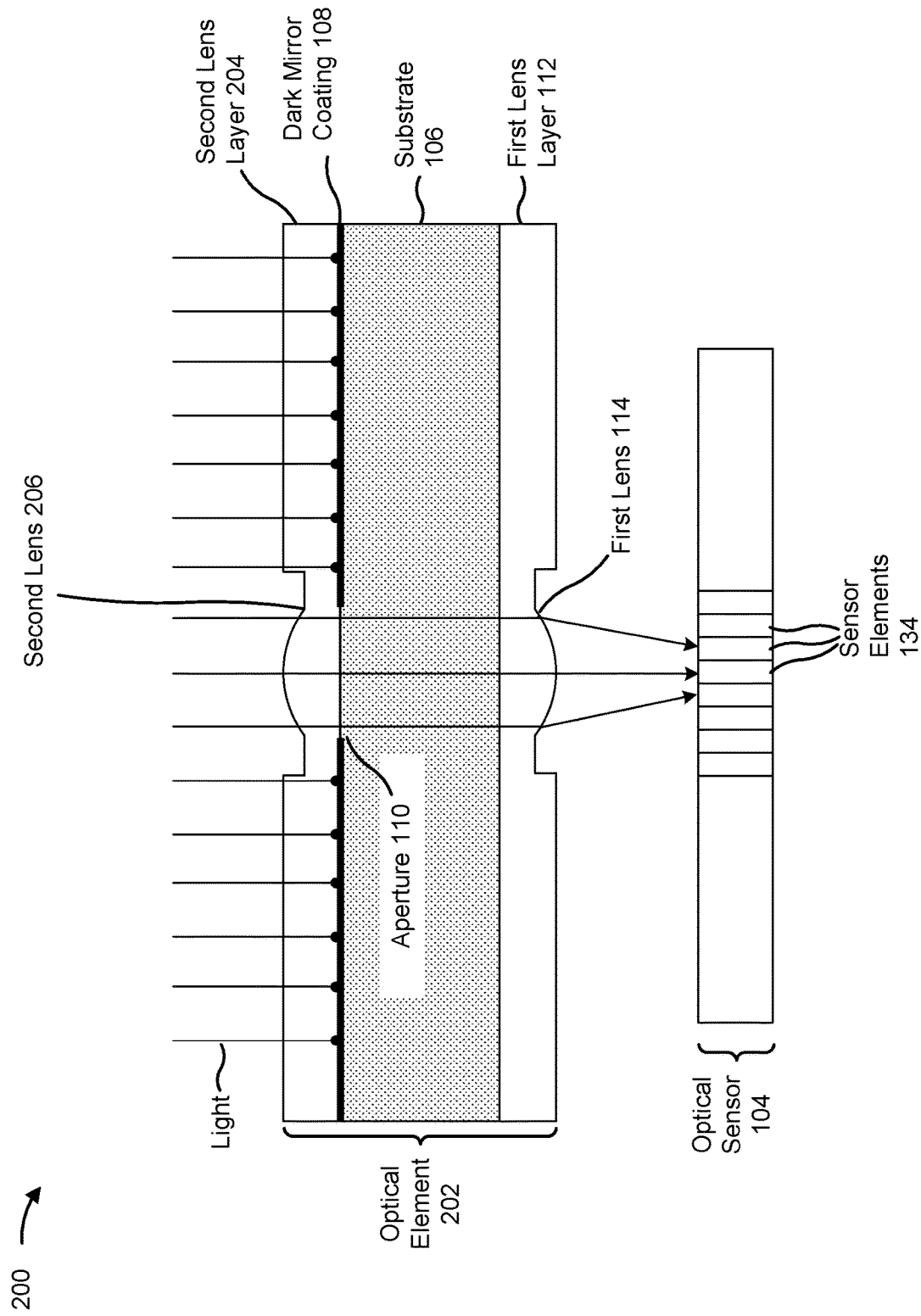

FIGS. 2A-2B are diagrams of an example implementation of an optical device 200 described herein. As shown in FIGS. 2A-2B, the optical device 300 includes an optical element 202 and/or the optical sensor 104. FIG. 2A shows an example side, cross-section view of the optical element 202. FIG. 2B shows an example propagation of light through the optical element 202 to the optical sensor 104.

The optical element 202 may be similar to the optical element 102 described herein (e.g., in relation to FIGS. 1A-1C). For example, the optical element 202 may include the substrate 106, the dark mirror coating 108, the aperture 110, the lens layer 112 (hereinafter referred to as the "first" lens layer 112), and/or the lens 114 (hereinafter referred to as the "first" lens 114) described herein (e.g., in relation to FIGS. 1A-1C). Accordingly, the substrate 106 may have the thickness 116, the aperture 110 may have the width 118, the first lens layer 112 may have the thickness 120, and/or the first lens 114 may have the width 122 and the thickness 124, among other examples.

The optical element 202 may include a second lens layer 204 and a second lens 206 (e.g., formed in the second lens layer 204). The second lens layer 204 may be disposed on (e.g., directly disposed on) the dark mirror coating 108, which is disposed on the first surface of the substrate 106. For example, as shown in FIG. 2A, the second lens layer 204 may be disposed on the dark mirror coating 108, which is disposed on the top surface of the substrate 106. The second lens layer 204 be a replicated organic lens layer or an etched inorganic lens layer. For example, the second lens layer 204 may comprise a polymer, such as PMMA, polystyrene, polycarbonate, COP, OKP, and/or another polymer, or an inorganic material, such as fused silica, silicon, germanium, tantalum, and/or silicon nitride, among other examples. In some implementations, a thickness 208 of the second lens layer 204 (a maximum thickness of the second lens layer 204, an average thickness of the second lens layer 204, or another measurement from a bottom surface of the second lens layer 204 to a top surface of the second lens layer 204) may be greater than or equal to 5 nm, 10 nm, 20 nm, 30 nm, 40 nm, 50 nm, and/or 100 nm. Additionally, or alternatively, the thickness 208 of the second lens layer 204 may be less than or equal to a particular thickness threshold. The particular thickness threshold, for example, may be less than or equal to 100 nm. Accordingly, the thickness 208 of the second lens layer 204 may be, for example, in a range from 5 µm to 100 nm.

The second lens 206 may be formed in the second lens layer 204. Accordingly, the second lens 206 may be a polymer lens that comprises, for example, PMMA, polystyrene, polycarbonate, COP, OKP, and/or another polymer. Alternatively, the second lens 206 may comprise an inorganic material, such as fused silica, silicon, germanium, tantalum, and/or silicon nitride, among other examples. The second lens 206 may be configured to receive and direct light to the aperture 110 (e.g., as described elsewhere herein). The second lens 206 may be configured to collimate, converge, diverge, and/or otherwise direct one or more portions of the light.

In some implementations, a width 210 of the second lens 206 (e.g., a diameter of the second lens 206 and/or a maximum distance measurement from one side of the second lens 206 to another side of the second lens 206) may be greater than or equal to 5 nm, 10 nm, 20 nm, 30 nm, 40 nm, 50 nm, and/or 100 nm. Additionally, or alternatively, the width 210 of the second lens 206 may be less than or equal to a particular width threshold. The particular width threshold, for example, may be less than or equal to 100 nm. Accordingly, the width 210 of the second lens 206 may be, for example, in a range from 5 μm to 100 μm. In some implementations, a thickness 212 of the second lens 206 (e.g., a maximum thickness of the second lens 206, an average thickness of the second lens 206, or another measurement from a bottom surface of the second lens 206 to a top surface of the second lens 206) may be less than or equal to the thickness 208 of the second lens layer 204.

In some implementations, the second lens 206 may be aligned with the aperture 110 and/or the first lens 114. For example, as shown in FIG. 2A, the second lens 206, the aperture 110, and the first lens 114 may each be centered on the alignment axis 126 (e.g., the alignment axis 126 passes through respective center portions of the second lens 206, the aperture 110, and the first lens 114). That is, as shown in FIG. 2A, the second lens 206, the aperture 110, and the first lens 114 may appear to be vertically stacked along the alignment axis 126. The alignment axis 126 may be, for example, the optical axis of the first lens 114 and/or the optical axis of the second lens 206.

In some implementations, the optical element 202 may be a monolithic optical element (e.g., the components of the optical element 202 are formed into a single, unified component). Accordingly, the optical element 202 has one or more dimensions, such as the x-dimension 128, they-dimension 130, and the z-dimension 132. For example, the x-dimension 128 may be a width of the optical element 202, the y-dimension 130 may be a length of the optical element 202, and the z-dimension 132 may be a thickness of the optical element 202. In some implementations, each of the x-dimension 128 and they-dimension 130 may be greater than or equal to 500 μm, 750 μm, 1 mm, 1.2 mm, 1.4 mm, and/or 1.75 mm. Additionally, or alternatively, each of the x-dimension 128 and the y-dimension 130 may be less than or equal to a particular dimension threshold. The particular dimension threshold, for example, may be less than or equal to 5 mm. Accordingly, each of the x-dimension 128 and the y-dimension 130 may be, for example, in a range from 500 μm to 5 mm. In some implementations, the z-dimension 132 may be less than or equal to a particular thickness threshold, which may be less than or equal to 245 μm, 300 μm, 425 μm, 450 μm, 500 μm, 600 μm, 750 μm, 1 mm, 1.5 mm, 2 mm, 2.3 mm, and/or other examples.

As shown in FIG. 2B, the optical sensor 104 may include the one or more sensor elements 134 (e.g., as described herein in relation to FIG. 1C). In some implementations, the optical element 202 and the optical sensor 104 may be aligned, such that the second lens 206, the aperture 110, and the first lens 114 are aligned with the one or more sensor elements 134. For example, as shown in FIG. 2B, the optical element 202 and the optical sensor 104 may be aligned such that one or more portions of light (e.g., that are associated with one or more spectral ranges) that fall incident on a surface of the optical element 202 (e.g., on a top surface of the optical element 102) are received and directed by the second lens 206, pass through the aperture 110, propagate through the substrate 106, and are directed by the first lens 114 (e.g., from a bottom surface of the optical element 202) to the one or more sensor elements 134 of the optical sensor 104. The second lens 206 may be configured to collimate the light and/or the first lens 114 may be configured to converge the light (e.g., on the one or more sensor elements 134). As further shown in FIG. 2B, the dark mirror coating 108 may absorb, block, and/or otherwise prevent reflection of (e.g., from the surface of the optical element 202) and/or transmission of (e.g., through the substrate 106) one or more other portions of the light that fall incident on the surface of the optical element 202 and transmit through the second lens layer 204 to the dark mirror coating 108.

As indicated above, FIGS. 2A-2B are provided as examples. Other examples may differ from what is described with regard to FIGS. 2A-2B.

Figure 3A:
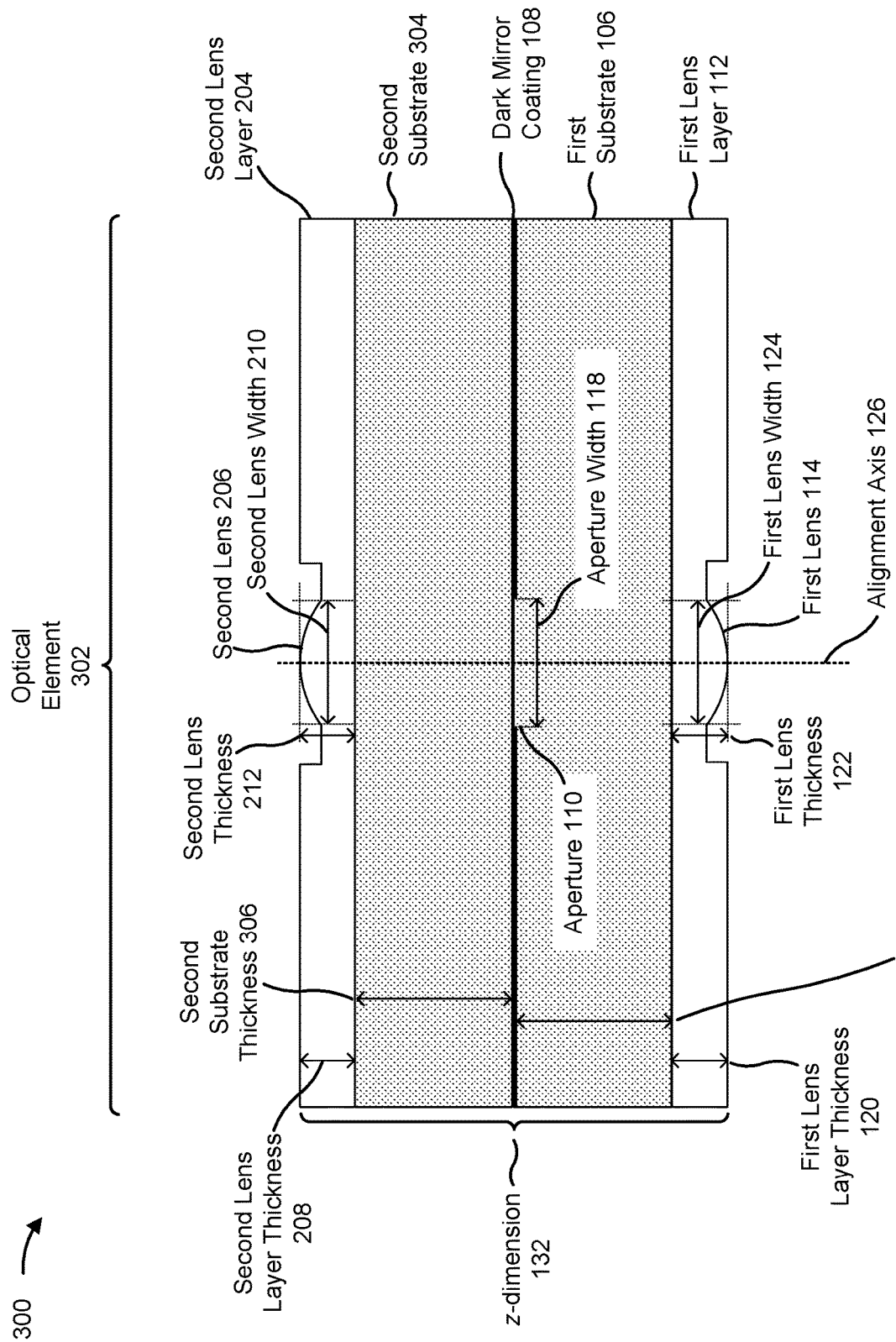
FIGS. 3A-3B are diagrams of an example implementation of an optical device described herein.
Figure 3B:
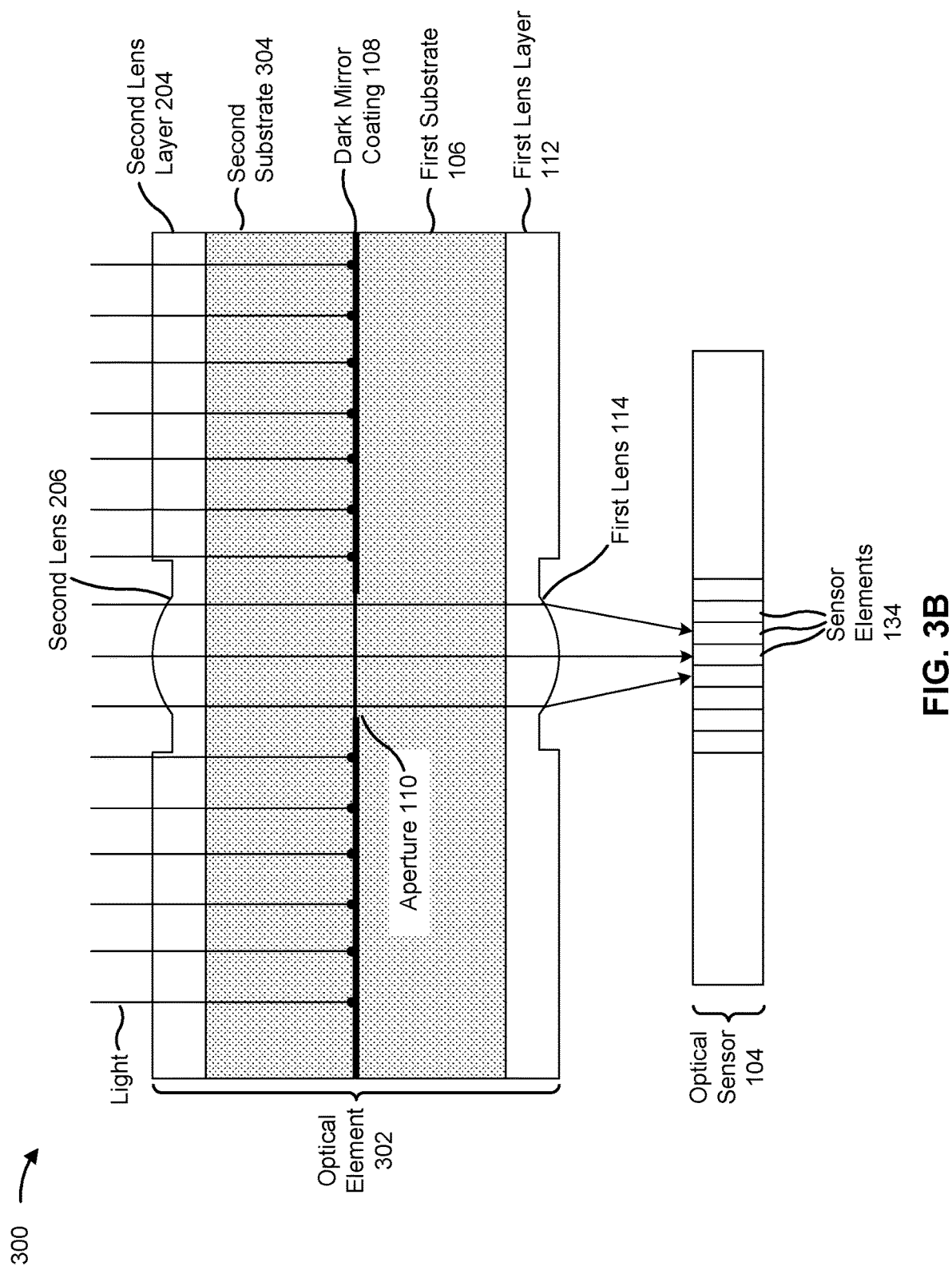

FIGS. 3A-3B are diagrams of an example implementation of an optical device 300 described herein. As shown in FIGS. 3A-3B, the optical device 300 includes an optical element 302 and/or the optical sensor 104. FIG. 3A shows an example side, cross-section view of the optical element 302. FIG. 3B shows an example propagation of light through the optical element 302 to the optical sensor 104.

The optical element 302 may be similar to the optical element 102 and/or the optical element 202 described herein (e.g., in relation to FIGS. 1A-1C and 2A-2B). For example, the optical element 302 may include the substrate 106 (hereinafter referred to as the "first" substrate 106), the dark mirror coating 108, the aperture 110, the first lens layer 112, the first lens 114, the second lens layer 204, and/or the second lens 206 described herein (e.g., in relation to FIGS. 1A-1C and 2A-2B). Accordingly, the first substrate 106 may have the thickness 116, the aperture 110 may have the width 118, the first lens layer 112 may have the thickness 120, the first lens 114 may have the width 122 and the thickness 124, the second lens layer 204 may have the thickness 208, and/or the second lens 206 may have the width 210 and the thickness 212, among other examples.

The optical element 302 may include a second substrate 304. The second substrate 304 may be disposed on (e.g., directly disposed on) the dark mirror coating 108, which is disposed on the first surface of the substrate 106. For example, as shown in FIG. 3A, the second substrate 304 may be disposed on the dark mirror coating 108, which is disposed on the top surface of the substrate 106. The second substrate 304 may comprise a glass substrate, a polymer substrate, a polycarbonate substrate, a metal substrate, an Si substrate, or a Ge substrate, among other examples. In some implementations, a thickness 306 of the second substrate 304 (a maximum thickness of the second substrate 304, an average thickness of the second substrate 304, or another measurement from a bottom surface of the second substrate 304 to a top surface of the second substrate 304) may be greater than or equal to 200 μm, 300 μm, 400 μm, 500 nm, 550 μm, 1 mm, 1.1 mm, and/or 2 mm. Additionally, or alternatively, the thickness 306 of the second substrate 304 may be less than or equal to a particular thickness threshold.

The particular thickness threshold, for example, may be less than or equal to 2 mm. Accordingly, the thickness 306 of the second substrate 304 may be, for example, in a range from 200 µm to 2 mm.

The second lens layer 204 may be disposed on (e.g., directly disposed on) the second substrate 304 (e.g., instead of being disposed on the dark mirror coating 108, as described herein in relation to FIGS. 2A-2B). The second lens 206 may be formed in the second lens layer 204, and the second lens 206 may be aligned with the aperture 110 and/or the first lens 114, as described herein (e.g., in relation to FIGS. 2A-2B).

In some implementations, the optical element 302 may be a monolithic optical element (e.g., the components of the optical element 302 are formed into a single, unified component). Accordingly, the optical element 302 has one or more dimensions, such as the x-dimension 128, the y-dimension 130, and the z-dimension 132. For example, the x-dimension 128 may be a width of the optical element 302, the y-dimension 130 may be a length of the optical element 302, and the z-dimension 132 may be a thickness of the optical element 302. In some implementations, each of the x-dimension 128 and the y-dimension 130 may be greater than or equal to 500 µm, 750 µm, 1 mm, 1.2 mm, 1.4 mm, and/or 1.75 mm. Additionally, or alternatively, each of the x-dimension 128 and the y-dimension 130 may be less than or equal to a particular dimension threshold. The particular dimension threshold, for example, may be less than or equal to 5 mm. Accordingly, each of the x-dimension 128 and the y-dimension 130 may be, for example, in a range from 500 µm to 5 mm. In some implementations, the z-dimension 132 may be less than or equal to a particular thickness threshold, which may be less than or equal to 425 µm, 450 µm, 500 µm, 600 µm, 700 µm, 800 µm 850 µm, 1 mm, 1.5 mm, 2 mm, 3 mm, 4 mm, 4.3 mm, and/or other examples.

As shown in FIG. 3B, the optical sensor 104 may include the one or more sensor elements 134 (e.g., as described herein in relation to FIG. 1C). In some implementations, the optical element 302 and the optical sensor 104 may be aligned, such that the second lens 206, the aperture 110, and the first lens 114 are aligned with the one or more sensor elements 134. For example, as shown in FIG. 3B, the optical element 302 and the optical sensor 104 may be aligned such that one or more portions of light (e.g., that are associated with one or more spectral ranges) that fall incident on a surface of the optical element 302 (e.g., on a top surface of the optical element 102) are received and directed by the second lens 206, propagate through the second substrate 304, pass through the aperture 110, propagate through the first substrate 106, and are directed by the first lens 114 (e.g., from a bottom surface of the optical element 302) to the one or more sensor elements 134 of the optical sensor 104. The second lens 206 may be configured to collimate the light and/or the first lens 114 may be configured to converge the light (e.g., on the one or more sensor elements 134). As further shown in FIG. 3B, the dark mirror coating 108 may absorb, block, and/or otherwise prevent reflection of (e.g., from the surface of the optical element 302) and/or transmission of (e.g., through the first substrate 106) one or more other portions of the light that fall incident on the surface of the optical element 202 and transmit through the second lens layer 204 and the second substrate 304 to the dark mirror coating 108.

As indicated above, FIGS. 3A-3B are provided as examples. Other examples may differ from what is described with regard to FIGS. 3A-3B.

Figure 4:
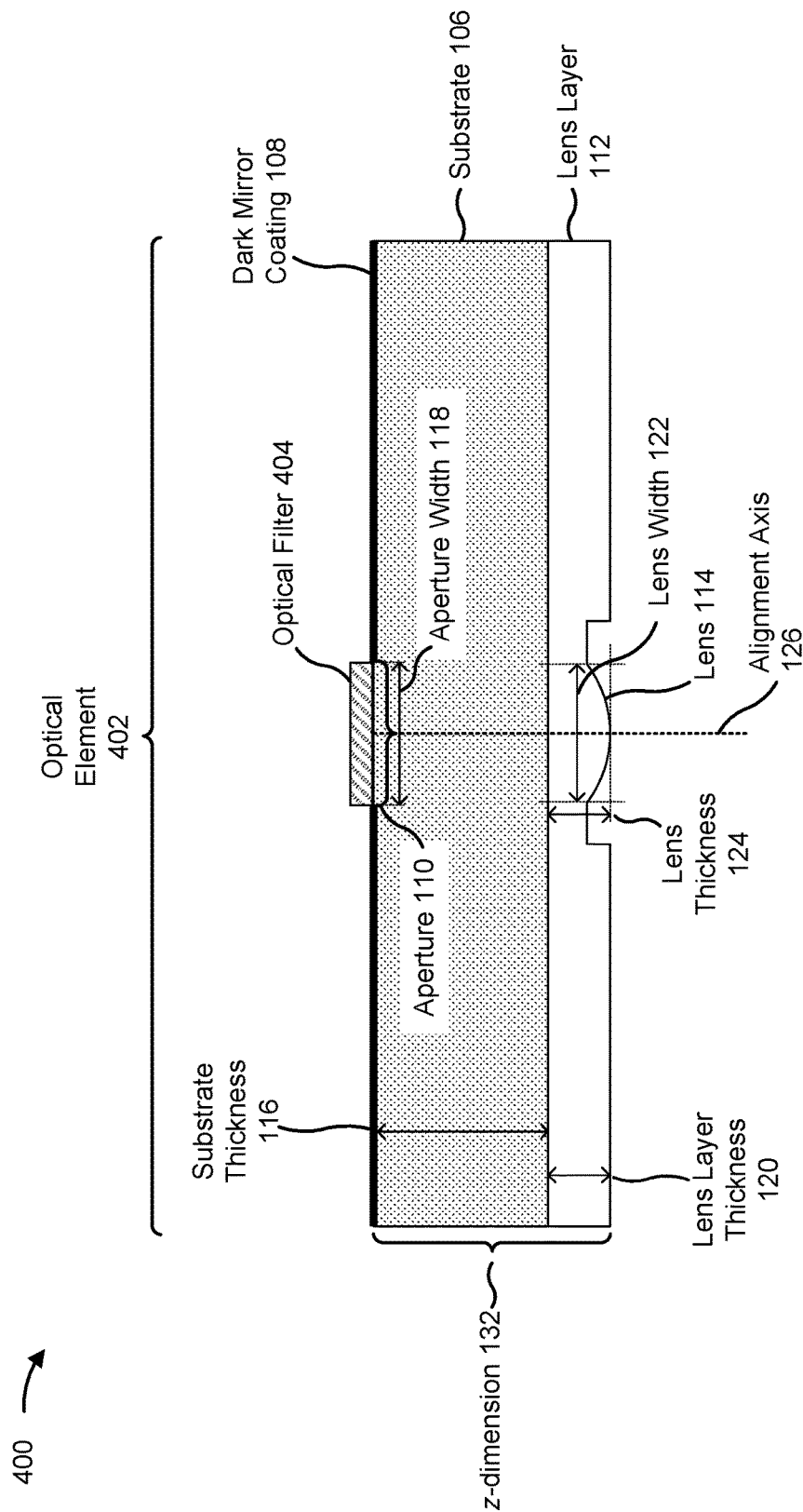
FIG. 4. is a diagram of an example implementation of an optical device described herein.

FIG. 4. is a diagram of an example implementation of an optical device 400 described herein. As shown in FIG. 4, the optical device 400 includes an optical element 402. FIG. 4 shows an example side, cross-section view of the optical element 402.

The optical element 202 may be similar to the optical element 102 described herein (e.g., in relation to FIGS. 1A-1C). For example, the optical element 402 may include the substrate 106, the dark mirror coating 108, the aperture 110, the lens layer 112, and/or the lens 114 described herein (e.g., in relation to FIGS. 1A-1C). Accordingly, the substrate 106 may have the thickness 116, the aperture 110 may have the width 118, the lens layer 112 may have the thickness 120, and/or the lens 114 may have the width 122 and the thickness 124, among other examples.

The optical element 402 may include an optical filter 404. The optical filter 404 may be disposed on (e.g., directly disposed on) the first surface of the substrate 106, such as within the aperture 110. That is, the optical filter 404 may cover a region of the first surface of the substrate 106 that is not covered by the dark mirror coating 108. For example, as shown in FIG. 4, the optical filter 404 may be disposed on the top surface of the substrate 106, within the aperture 110. In some implementations, the optical filter 404 may comprise at least one of a spectral filter, a multispectral filter, a bandpass filter, a blocking filter, a long-wave pass filter, a short-wave pass filter, a dichroic filter, a linear variable filter, a circular variable filter, a Fabry-Perot filter, a Bayer filter, a plasmonic filter, a photonic crystal filter, a nanostructure or metamaterial filter, an absorbent filter, a beam splitter, a polarizing beam splitter, a notch filter, an anti-reflection filter, a reflector, or a mirror, among other examples. The optical filter 404 may include one or more layers, such as one or more sets of alternating high refractive index and low refractive index layers.

As indicated above, FIG. 4 is provided as an example. Other examples may differ from what is described with regard to FIG. 4.

Figure 5:
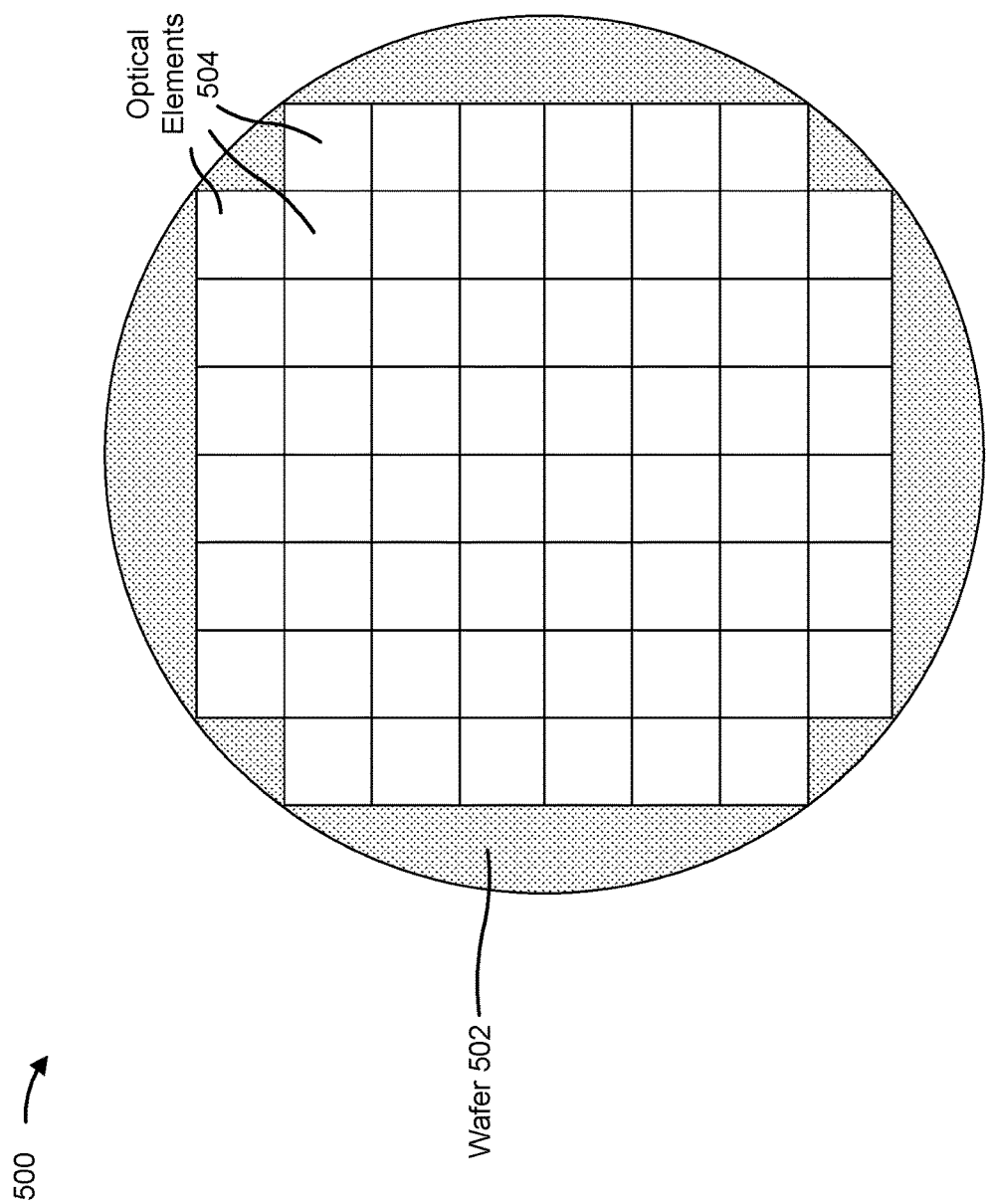
FIG. 5 is a diagram of an example implementation of a wafer.

FIG. 5 is a diagram of an example implementation 500 of a wafer 502. As shown in FIG. 5, the wafer 502 may include a plurality of optical elements 504. The plurality of optical elements 504 may be formed using the formation process described herein in relation to FIGS. 6A-6E.

Each optical element 504 (e.g., after completion of the formation process) may be configured in a same, or similar, manner as that of the optical element 102, the optical element 202, the optical element 302, and/or the optical element 402 described elsewhere herein in relation to FIGS. 1A-1C, 2A-2B, 3A-3B, and 4. For example, each optical element 504 may include a first substrate 106, a dark mirror coating 108, an aperture 110, a first lens layer 112, a first lens 114, a second lens layer 204, a second lens 206, a second substrate 304, and/or an optical filter 404.

As further shown in FIG. 5, the plurality of optical elements 504 may be disposed on (or as part of) the wafer 502 to utilize an optimal amount of a surface area of the wafer 502. Accordingly, a particular number of optical elements 504 may be formed on the wafer 502 (e.g., using the formation process described herein in relation to FIGS. 6A-6E), such as to optimally utilize the surface area of the wafer 502. The particular number may be greater than or equal to $2\pi R/w$, where R is a radius of the wafer 502 and w is a width (e.g., an x-dimension 128 or a y-dimension 130 of each optical element 504).

As indicated above, FIG. 5 is provided as an example. Other examples may differ from what is described with regard to FIG. 5.

FIGS. 6A-6E are diagrams of an example implementation 600 of a formation process for manufacturing an optical element (e.g., that is the same as, or similar to, the optical elements 102, 202, 302, 402, and/or 504, described herein in relation to FIGS. 1A-1C, 2A-2B, 3A-3B, 4, and 5). As shown in FIGS. 6A-6E, the optical element may be formed by forming, on a first substrate (e.g., that is the same as, or similar to, the first substrate 106), a dark mirror coating (e.g., that is the same as, or similar to, the dark mirror coating 108), a first lens (e.g., that is the same as, or similar to, the first lens 114), a second lens (e.g., that is the same as, or similar to, the second lens 206), a second substrate (e.g., that is the same as, or similar to, the second substrate 304), and/or an optical filter (e.g., that is the same as, or similar to, the optical filter 404). In some implementations, one or more layers, structures, and/or components may be fabricated using a sputtering procedure, a photolithographic procedure, an etching procedure, a lift off procedure, a scraping procedure, an annealing procedure, a molding procedure, a casting procedure, a machining procedure, a stamping procedure, and/or a singulation procedure, among other examples.

Figure 6A:
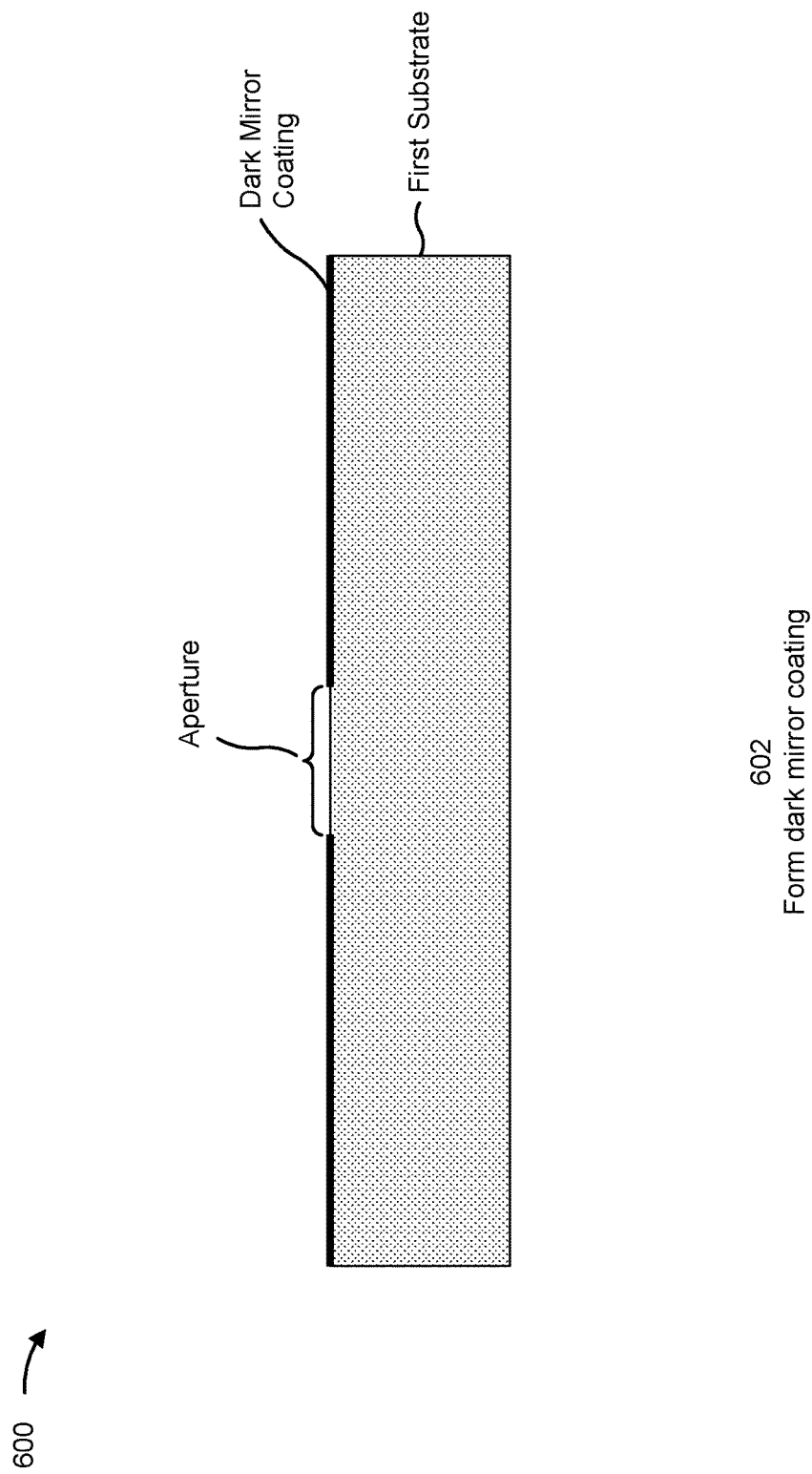
FIGS. 6A-6E are diagrams of an example implementation of a formation process for manufacturing an optical element.

As shown in FIG. 6A, and by reference number 602, the formation process may include forming the dark mirror coating. For example, the formation process may include a sputtering procedure, a photolithographic procedure, a lift off procedure, and/or one or more other procedures to form the dark mirror coating on a first surface of the first substrate. This may include, for example, applying a photoresist layer onto the first surface of the first substrate, patterning the photoresist layer, sputtering the dark mirror coating on the first surface of the first substrate and the patterned photoresist layer, and removing the patterned photoresist layer. Accordingly, this may form an aperture (e.g., that is the same as, or similar to, the aperture 110). That is, the aperture may be formed, in the dark mirror coating, in a region on the first surface of the first substrate where the patterned photoresist layer was removed.

Figure 6B:
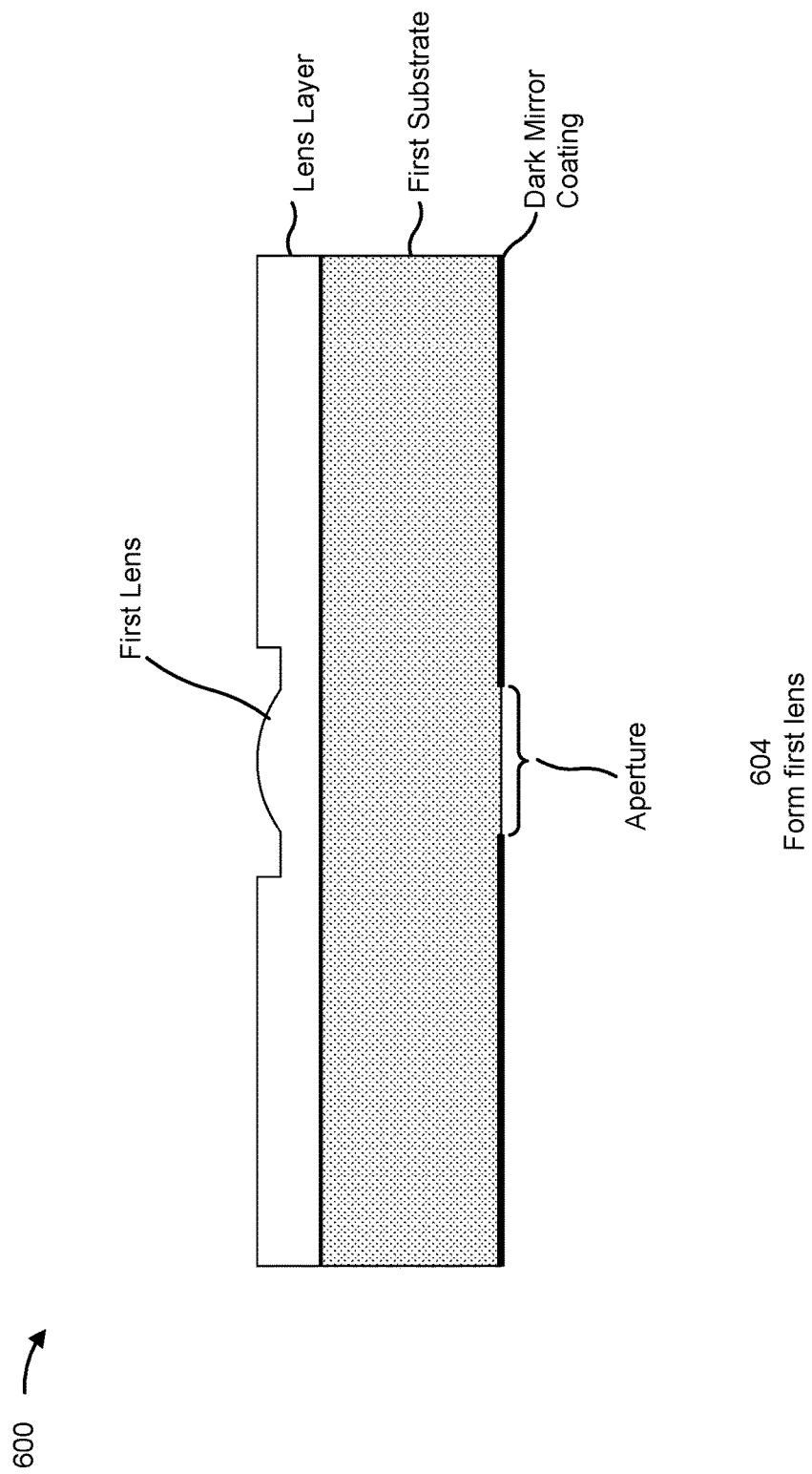

As shown in FIG. 6B, and by reference number 604, the formation process may include forming the first lens. For example, the formation process may include (e.g., after turning the first substrate upside down, such that the first surface of the first substrate, on which the dark mirror coating is formed, is facing down) a sputtering procedure, a photolithographic procedure, a molding procedure, a casting procedure, a machining procedure, a stamping procedure, and/or one or more other procedures to form the first lens on a second surface of the first substrate. This may include, for example, forming a first lens layer (e.g., that is the same as, or similar to, the first lens layer 112) and forming the first lens in the first lens layer. In some implementations, the first lens may be formed to be aligned with the aperture (e.g., as described elsewhere herein).

Figure 6C:
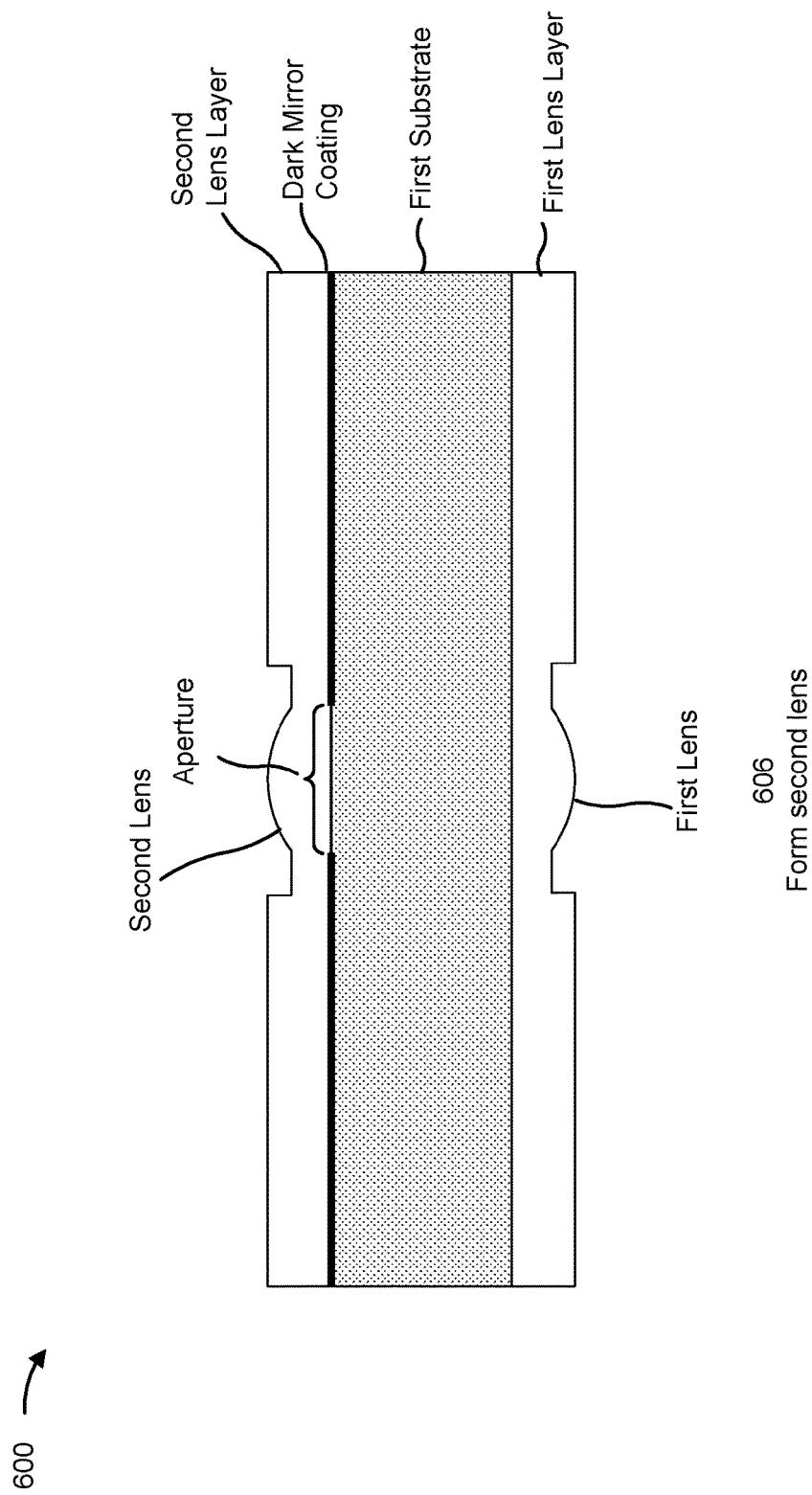

As shown in FIG. 6C, and by reference number 606, the formation process may include forming the second lens. For example, the formation process may include (e.g., after turning the first substrate upside down, such that the first surface of the first substrate, on which the dark mirror coating is formed, is facing up) a sputtering procedure, a photolithographic procedure, a molding procedure, a casting procedure, a machining procedure, a stamping procedure, and/or one or more other procedures to form the second lens on the dark mirror coating (and a region of the first surface of the first substrate not covered by the dark mirror coating that is associated with the aperture). This may include, for example, forming a second lens layer (e.g., that is the same as, or similar to, the second lens layer 204) and forming the second lens in the second lens layer. In some implementations, the second lens may be formed to be aligned with the aperture and/or the first lens (e.g., as described elsewhere herein).

Figure 6D:
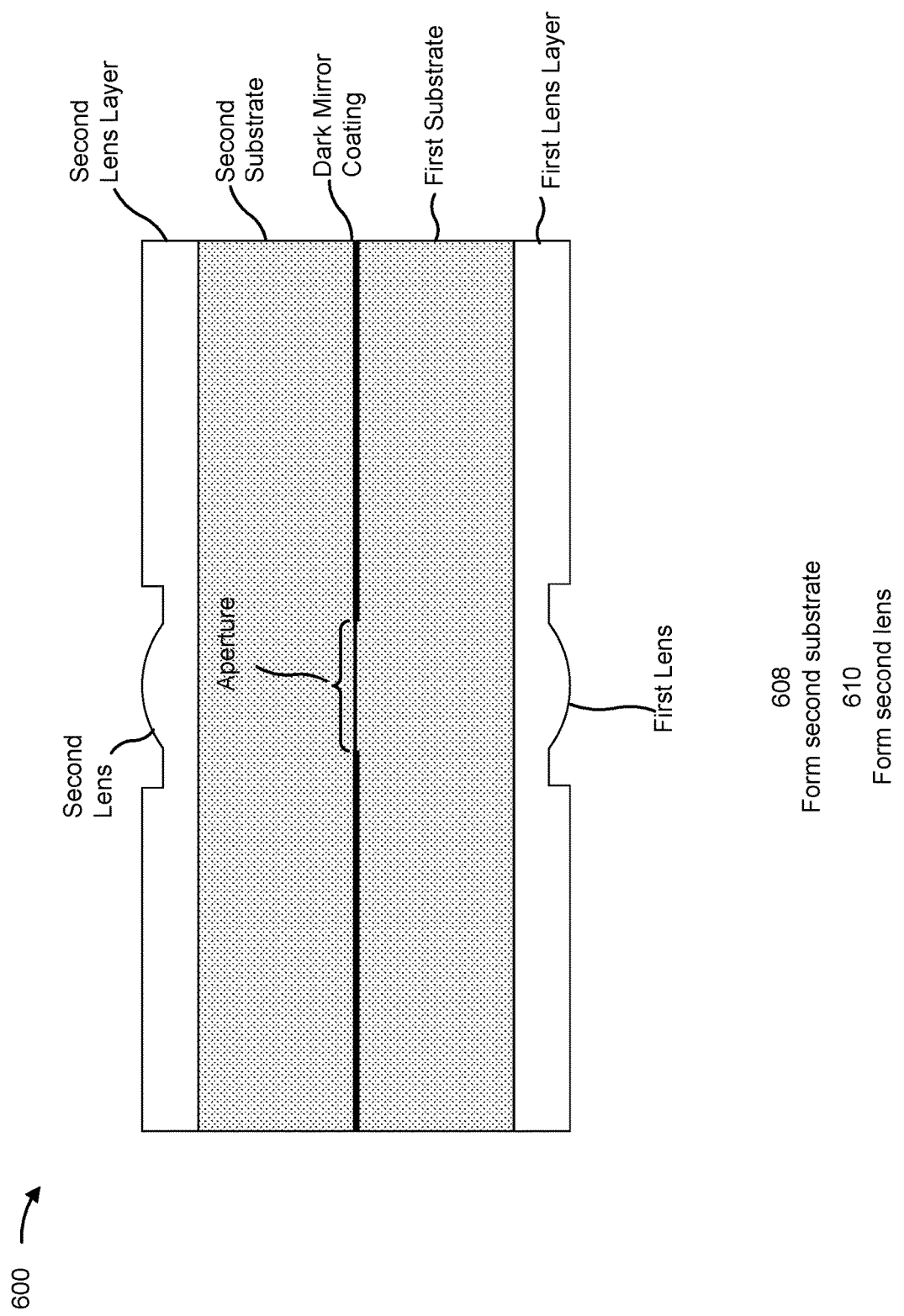

As shown in FIG. 6D, and by references number 608 and 610, the formation process may include forming the second substrate and the second lens (e.g., as an alternative to only forming the second lens, as described herein in relation to FIG. 1C and reference number 606). For example, the formation process may include (e.g., after turning the first substrate upside down, such that the first surface of the first substrate, on which the dark mirror coating is formed, is facing up) disposing the second substrate on the dark mirror coating (and a region of the first surface of the first substrate not covered by the dark mirror coating that is associated with the aperture), such as part of forming the dark mirror coating (e.g., so that the dark mirror coating also acts as an adhesive, or other connecting material, to bond the second substrate to the first substrate). The second lens then may be formed on a surface of the second substrate in a similar, or same, manner as that disclosed herein in relation to FIG. 1C and reference number 606.

Figure 6E:
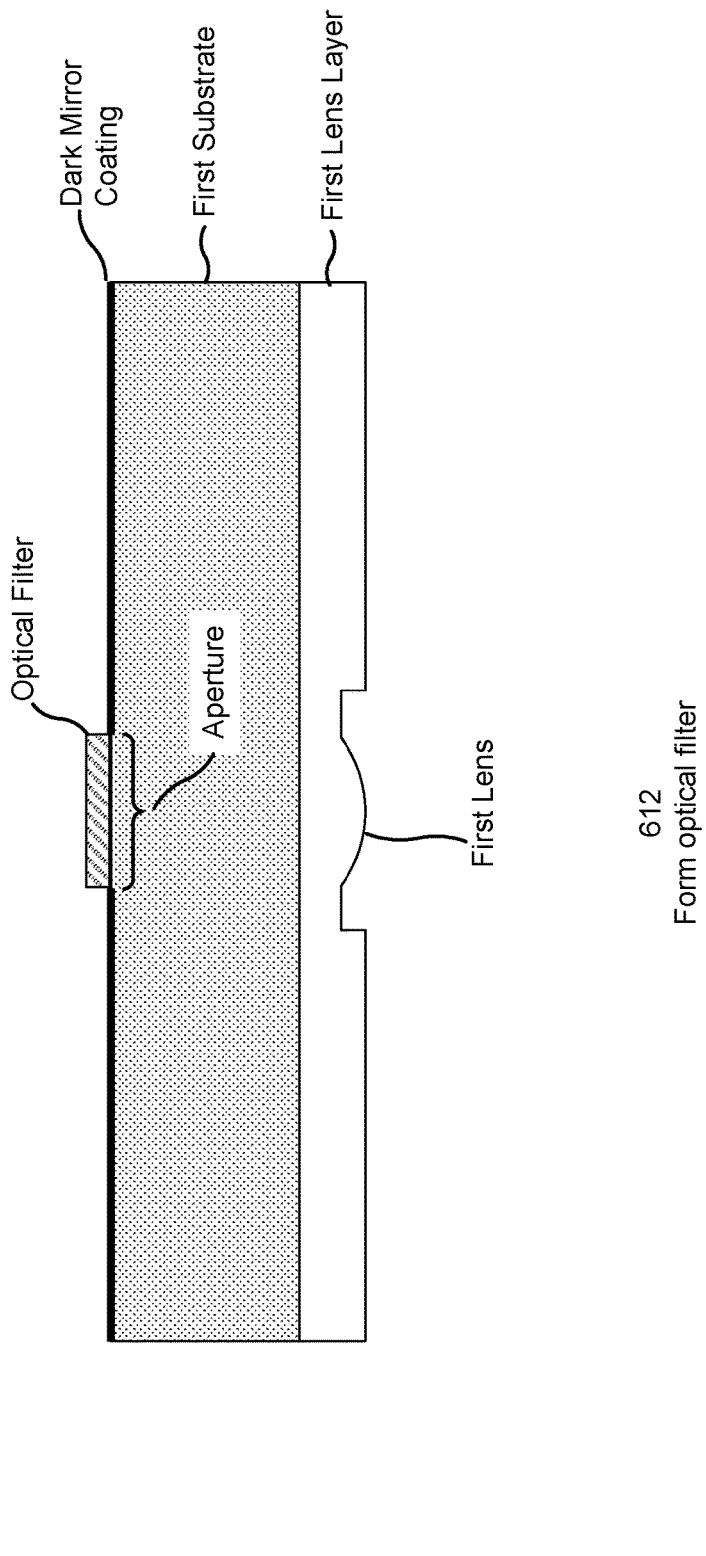

Additionally, or alternatively, as shown in FIG. 6E, and by reference number 612, the formation process may include forming the optical filter. For example, the formation process may include a sputtering procedure, a photolithographic procedure, an etching procedure, a lift off procedure, and/or one or more other procedures to form the optical filter on the first surface of the first substrate, such as within the aperture.

In this way, as described herein in relation to FIGS. 6A-6E, the formation process may form the optical element such that the optical element is a monolithic optical element. In some implementations, the formation process may include forming a plurality of optical elements on a wafer (e.g., on respective regions of the wafer) at a same time (e.g., as part of the same formation process). Accordingly, each optical element may be configured to provide a matching optical performance (e.g., as other optical elements of the plurality of optical elements), as described elsewhere herein.

As indicated above, FIGS. 6A-6E are provided as an example. Other examples may differ from what is described with regard to FIGS. 6A-6E.

Figure 7:
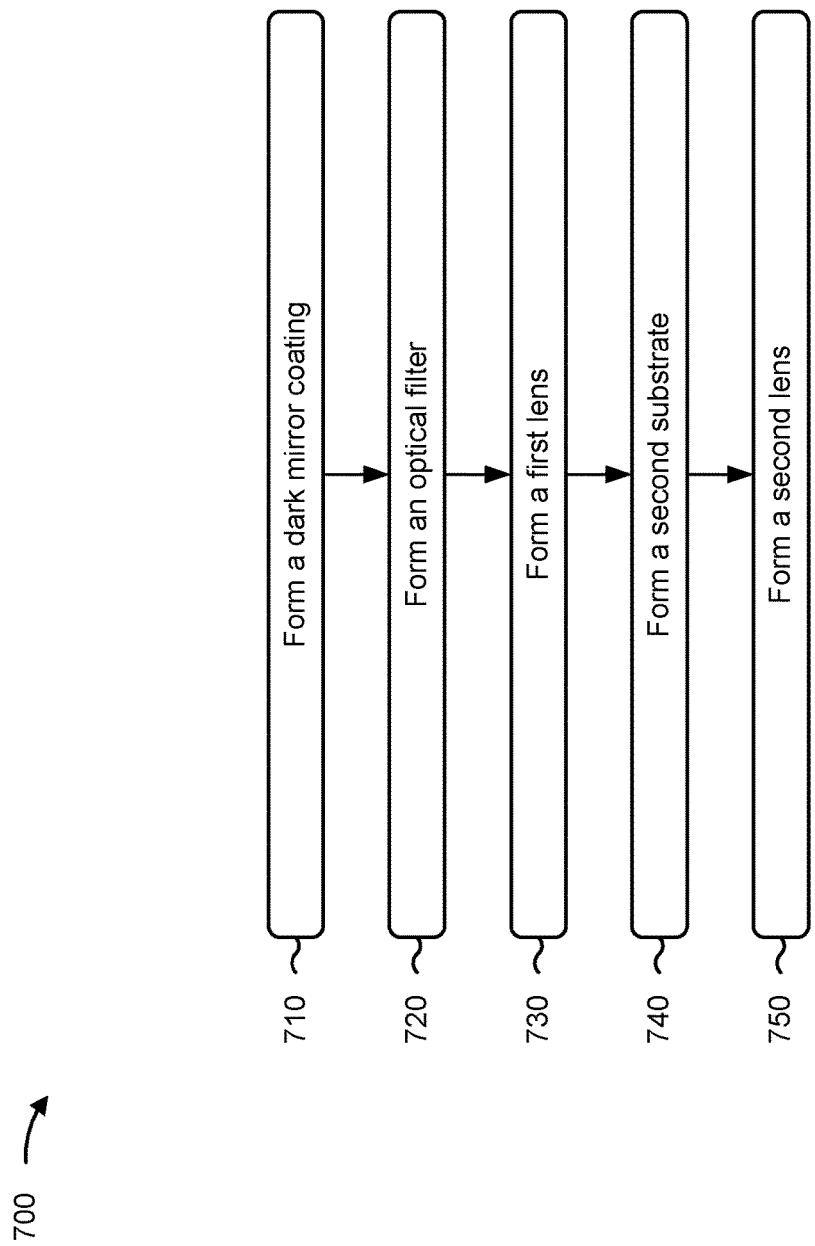
FIG. 7 is a flowchart of an example process associated with forming an optical element.

FIG. 7 is a flowchart of an example process 700 associated with forming an optical element. In some implementations, one or more process blocks of FIG. 7 are performed by a system, such as a system capable of performing one or more formation techniques described herein.

As shown in FIG. 7, process 700 may include forming a dark mirror coating (block 710). For example, the system may form a dark mirror coating, as described above.

As further shown in FIG. 7, process 700 may include forming an optical filter (block 720). For example, the system may form an optical filter, as described above.

As further shown in FIG. 7, process 700 may include forming a first lens (block 730). For example, the system may form a first lens, as described above.

As further shown in FIG. 7, process 700 may include forming a second substrate (block 740). For example, the system may form a second substrate, as described above.

As further shown in FIG. 7, process 700 may include forming a second lens (block 750). For example, the system may form a second lens, as described above.

Process 700 may include additional implementations, such as any single implementation or any combination of implementations described below and/or in connection with one or more other processes described elsewhere herein.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical element comprising:
   a first glass substrate;
   a dark mirror coating disposed on a first surface of the first glass substrate,
      wherein an aperture is formed in the dark mirror coating;
   a first lens layer disposed on a second surface of the first glass substrate,
      wherein the first lens layer comprises a first lens;
   a first surface of a second glass substrate disposed directly on the dark mirror coating; and
   a second lens layer disposed on a second surface of the second glass substrate, wherein:
      the second lens layer comprises a second lens, and
      the aperture is aligned with the first lens and the second lens.

2. The optical element of claim 1, wherein the optical element is a monolithic optical element.

3. The optical element of claim 1, further comprising:
   an optical filter disposed on the first surface of the first glass substrate within the aperture.

4. The optical element of claim 1, wherein a thickness of the first glass substrate is in a range from 200 micrometers to 2 millimeters.

5. The optical element of claim 1, wherein a thickness of the first lens is in a range from 20 micrometers to 100 micrometers.

6. The optical element of claim 1, wherein the dark mirror coating is configured to reflect less than 1% of light associated with one or more spectral ranges.

7. The optical element of claim 1, wherein:
   the first lens is configured to converge light associated with one or more spectral ranges; and
   the second lens is configured to collimate light associated with the one or more spectral ranges.

8. The optical element of claim 1, wherein a width of the second lens is in a range of 5 micrometers to 100 micrometers.

9. The optical element of claim 1, wherein a thickness of the second lens is less than or equal to the thickness of the second lens layer.

10. The optical element of claim 1, wherein a thickness of the second lens layer is in a range from 5 micrometers to 100 micrometers.

11. The optical element of claim 1, wherein a width of the aperture is in a range of 5 micrometers to 100 micrometers.

12. The optical element of claim 1, wherein a dimension of the optical element is in a range of 500 micrometers to 5 millimeters.

13. An optical device comprising:
   an optical sensor; and
   an optical element comprising:
      a first glass substrate;
      a dark mirror coating disposed on a first surface of the first glass substrate,
         wherein an aperture is formed in the dark mirror coating;
      a first lens disposed on a second surface of the first glass substrate;
      a first surface of a second glass substrate disposed directly on the dark mirror coating; and
      a second lens disposed on a second surface of the second glass substrate,
         wherein the aperture is aligned with the first lens and the second lens.

14. The optical device of claim 13, wherein the optical element is disposed over the optical sensor, and wherein the first lens is configured to converge light associated with one or more spectral ranges on one or more sensor elements of the optical sensor.

15. The optical device of claim 14, wherein the dark mirror coating is configured to reflect less than 1% of light associated with the one or more spectral ranges.

16. The optical device of claim 13, wherein:

the first lens is configured to converge light associated with one or more spectral ranges; and the second lens is configured to collimate light associated with the one or more spectral ranges.

17. The optical device of claim 13, wherein the optical element further comprises:

an optical filter disposed on the first surface of the first glass substrate within the aperture.

18. A wafer, comprising:

a plurality of optical elements, wherein each optical element includes:

a first glass substrate;

a dark mirror coating disposed on a first surface of the first glass substrate,
   wherein an aperture is formed in the dark mirror coating;

a first lens disposed on a second surface of the first glass substrate;

a first surface of a second glass substrate disposed directly on the dark mirror coating; and a second lens disposed on a second surface of the second glass substrate,
   wherein the aperture is aligned with the first lens and the second lens.

19. The wafer of claim 18, wherein each optical element further includes:

an optical filter disposed on the first surface of the first glass substrate within the aperture.

20. The wafer of claim 18, wherein the dark mirror coating of each optical element is configured to reflect less than 1% of light associated with one or more spectral ranges.

* * * * *